(12) United States Patent
Bowman et al.

(10) Patent No.: US 12,086,155 B2
(45) Date of Patent: *Sep. 10, 2024

(54) SGX BASED FLOW CONTROL FOR DISTRIBUTED LEDGERS

(71) Applicant: Intel Corporation, Santa Clara, CA (US)

(72) Inventors: Mic Bowman, Boise, ID (US); Andrea Miele, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/547,711

(22) Filed: Dec. 10, 2021

(65) Prior Publication Data

US 2022/0171789 A1 Jun. 2, 2022

Related U.S. Application Data

(63) Continuation of application No. 16/290,780, filed on Mar. 1, 2019, now Pat. No. 11,243,977.

(51) Int. Cl.
*G06F 16/00* (2019.01)
*G06F 16/23* (2019.01)
*G06F 16/27* (2019.01)

(52) U.S. Cl.
CPC .............. *G06F 16/27* (2019.01); *G06F 16/23* (2019.01)

(58) Field of Classification Search
CPC ...................................................... G06F 16/27
See application file for complete search history.

(56) References Cited

U.S. PATENT DOCUMENTS

| | | |
|---|---|---|
| 6,950,395 B1 | 9/2005 | Bashandy et al. |
| 2003/0069970 A1 | 4/2003 | Kim et al. |
| 2007/0300226 A1* | 12/2007 | Bliss ....................... G06F 9/526 718/100 |
| 2017/0026295 A1* | 1/2017 | Yin ......................... H04L 47/12 |
| 2017/0180254 A1* | 6/2017 | Certain ................. G06F 9/5061 |
| 2018/0019879 A1 | 1/2018 | Kravitz et al. |
| 2019/0356470 A1 | 11/2019 | Deshpande et al. |
| 2020/0028788 A1 | 1/2020 | Chen et al. |
| 2020/0036514 A1* | 1/2020 | Christensen .......... H04L 9/3297 |
| 2021/0391992 A1* | 12/2021 | Schiffman ............... G06F 21/33 |

\* cited by examiner

*Primary Examiner* — Khanh B Pham
(74) *Attorney, Agent, or Firm* — JAFFERY WATSON MENDONSA & HAMILTON LLP

(57) ABSTRACT

Various embodiments are generally directed to an apparatus, system, and other techniques for shared, trusted token generation for a token-bucket flow control policy implemented in a distributed ledger. Tokens may be generated by blocks in the distributed ledger, which may be a blockchain system. Trusted execution hardware may be used as a proof algorithm to ensure that a token exists, and that client has legitimately acquired or accumulated the token prior to using it to submit a transaction.

7 Claims, 7 Drawing Sheets

SGX BASED FLOW CONTROL FOR DISTRIBUTED LEDGERS

CROSS-REFERENCE TO RELATED APPLICATIONS

This application is a continuation of, claims the benefit of and priority to previously filed U.S. patent application Ser. No. 16/290,780 filed Mar. 1, 2019, entitled "SGX BASED FLOW CONTROL FOR DISTRIBUTED LEDGERS", which is hereby incorporated by reference in its entirety.

TECHNICAL FIELD

Embodiments described herein generally relate to techniques for providing transaction flow control.

BACKGROUND

Flow control solutions in existing distributed systems focus on "trusted" endpoints to implement some type of flow-control technique, such as a scheduling algorithm, to control the rate of transaction submissions. Typically, the underlying assumption with such systems is that the endpoints will perfectly follow all established flow policies, and will not, either intentionally or unintentionally, thwart the flow-control framework. Thus, commonly used flow control techniques do not constrain or place any restrictions on the endpoints.

The assumption in distributed ledger solutions, however, is that the participants are untrustworthy. Based on this assumption, a digital currency system may be paired with a distributed ledger to perform transaction flow control. To disincentive participants from submitting large quantities of transactions, the participants may be required to pay a predetermined fee for each transaction. But, having to pair a distributed ledger with a digital currency, such as Bitcoin, Ethereum, etc., may limit the overall applicability of the technology. Moreover, maintaining a digital currency system on a distributed ledger may be costly and may be inapplicable to systems that are unrelated to economic aspects of a currency.

DETAILED DESCRIPTION

Figure 1:
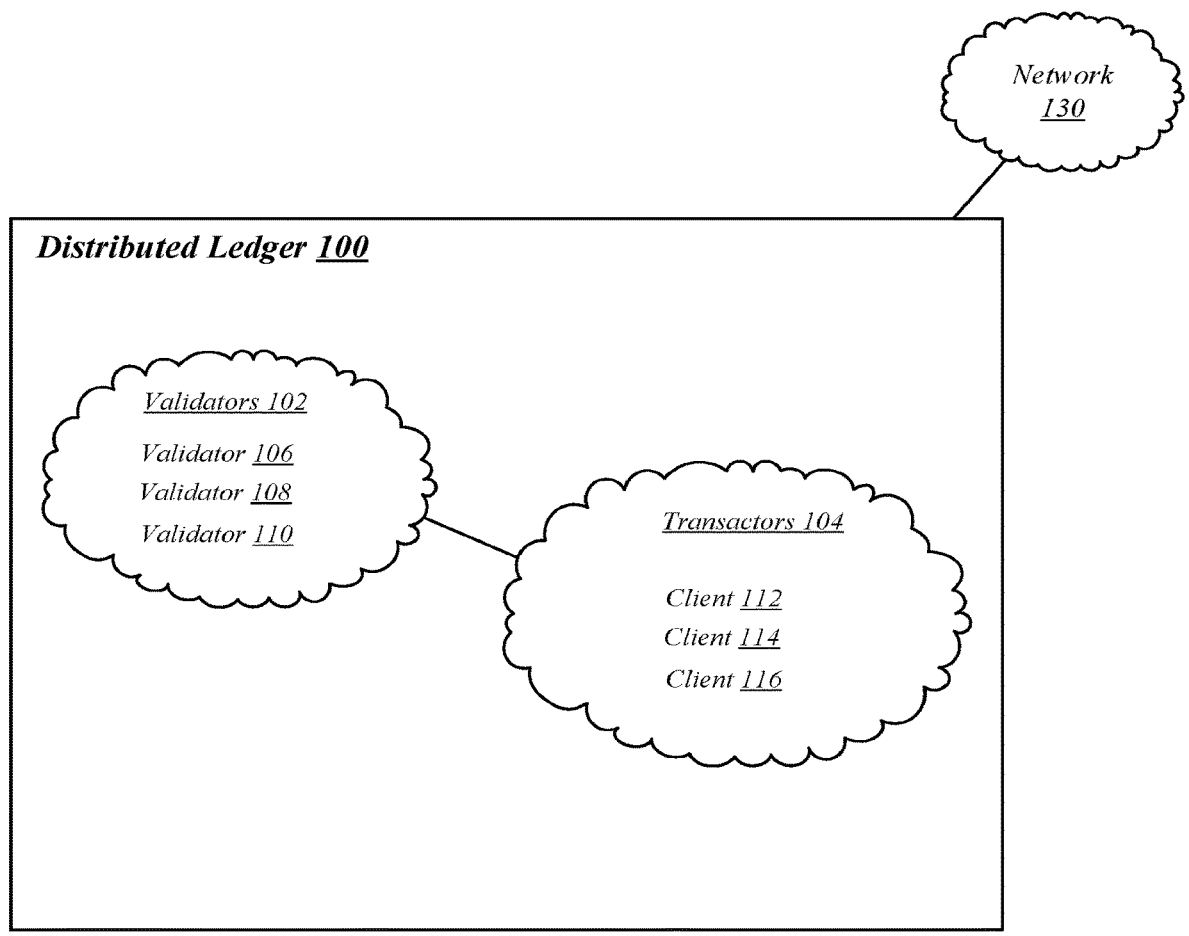
FIG. 1 illustrates an example distributed ledger according to one or more embodiments.

Various embodiments are generally directed to implementing a token-bucket flow control policy in a distributed ledger to throttle the rate of transaction submissions among untrusted clients. Blocks in the distributed ledger, which may be a blockchain system, may generate tokens in a transparent, shared, and trusted manner. For example, each block may generate one or more tokens, which may be accumulated and "spent" by a client to submit a transaction (e.g., transmission of a data packet, etc.) according to one or more flow control policies set by the distributed ledger. Since the one or more tokens are generated by individual blocks, the "drip" rate of the tokens, e.g., a time the client must wait before being issued the next token, may correspond to the rate at which the individual blocks are consecutively published on the blockchain. In at least this regard, the drip rate (or the clock rate) is not only verifiable, trusted, and transparent, but it cannot be manipulated by any of the clients, which promotes regularity and security in the distributed ledger.

Prior to using or spending the one or more tokens, each client may be required to prove that the one or more tokens exist and was legitimately acquired. For example, a client may offer proof using Software Guard Extensions (SGX) technology by Intel® Corporation, which may be a set of central processing unit (CPU) instruction codes that allow user-level code to allocate private regions of memory protected from processes running at higher privilege levels. These allocated private regions of memory may be referred to as "enclaves" and may be considered trusted execution hardware. Thus, an SGX enclave may produce a "proof-of-existence" certificate for each of the one or more tokens with a digital signature that maps or ties the token back to a specific, valid block in the blockchain that was generated at a specific, valid drip rate. Moreover, the digital signature may also map or tie the token back to the client's identity.

In addition to proving that a token exists and has been legitimately accumulated prior its spending, the distributed ledger (or components thereof) may also verify that the token has not been previously used by the client. For example, the distributed ledger may search the blockchain for any previous transaction that was submitted by the client using the same token.

As described above, one of the numerous problems in previous flow control solutions for distributed systems is that clients are automatically trusted to behave perfectly within the systems. This fails to account for potential self-interested actors that have no interest in cooperating or following established flow policies. Additionally, existing flow control techniques implemented in distributed ledgers are problematic in that they are commonly tied to a digital currency system, which may be costly, inapplicable to certain technologies, and limit the overall applicability of the technology. The embodiments and examples described herein overcome these problems. By implementing a token-bucket-based flow control process in a distributed ledger and tying the distributed system to a common trust anchor (e.g., SGX), the existence and legitimacy of every generated and spent token can be mapped and verified. In at least this regard, the SGX-based token-bucket flow control implemented in the distributed ledger is at least secure, robust, and trustworthy (even though the clients may not), and further, does not require digital currencies to enforce flow control, which simplifies distributed ledger architectures in contexts where digital currencies are unnecessary or undesirable. Advantageously, use cases or applications of the SGX-based token-bucket flow control may include various classes of network communication, e-commerce websites, etc.

FIG. 1 illustrates an example of a distributed ledger 100 according to embodiments of the present disclosure. The distributed ledger 100 may be a network of computing devices implementing one or more consensus algorithms and other suitable types of algorithms to facilitate various types of transactions and data communications. In examples, the distributed ledger 100 may be a blockchain system, a Proof of Elapsed Time (PoET) distrusted consensus ledger, etc., which may be either public or private. The distributed ledger 100 may verify and/or maintain blocks associated with one or more blockchains therein. In further examples, a modular platform may be used to build, deploy, and/or run the distributed ledger 100.

As shown, the distributed ledger 100 includes a pool of "validators" 102 and a pool of "transactors" 104. The pool of validators 102, e.g., validator 106, validator 108, validator 110, may be responsible for verifying all transactions within the ledger, e.g., the blockchain system, and in instances, may be responsible for running distributed consensus rounds (e.g., byzantine rounds) periodically to determine what set of outstanding valid transactions gets stored on the ledger next. The pool of transactors 104 may include one or more clients (distributed ledger users), e.g., client 112, client 114, client 116, that may submit transactions to the pool of validators 102 to get the transactions validated and stored on the ledger. It may be understood that the pool of validators 102 and transactors 104 may be the computing devices interconnected in the distributed ledger 100. Moreover, the distributed ledger 100 and the components therein may be connected to one or more external networks, such as network 130.

In embodiments, each client in the pool of transactors 104 may use an SGX enclave to at least map each accumulated token back to its originating block in the blockchain, as will be described below. In that regard, the SGX provides integrity to the token mapping process since the SGX ensures that the correct code on each client is executed. Moreover, by using SGX, each client may be able to prove to other clients and/or the pool of validators in the distributed ledger that the computations and/or proofs performed or executed thereon is correct and trustworthy.

Figure 2:
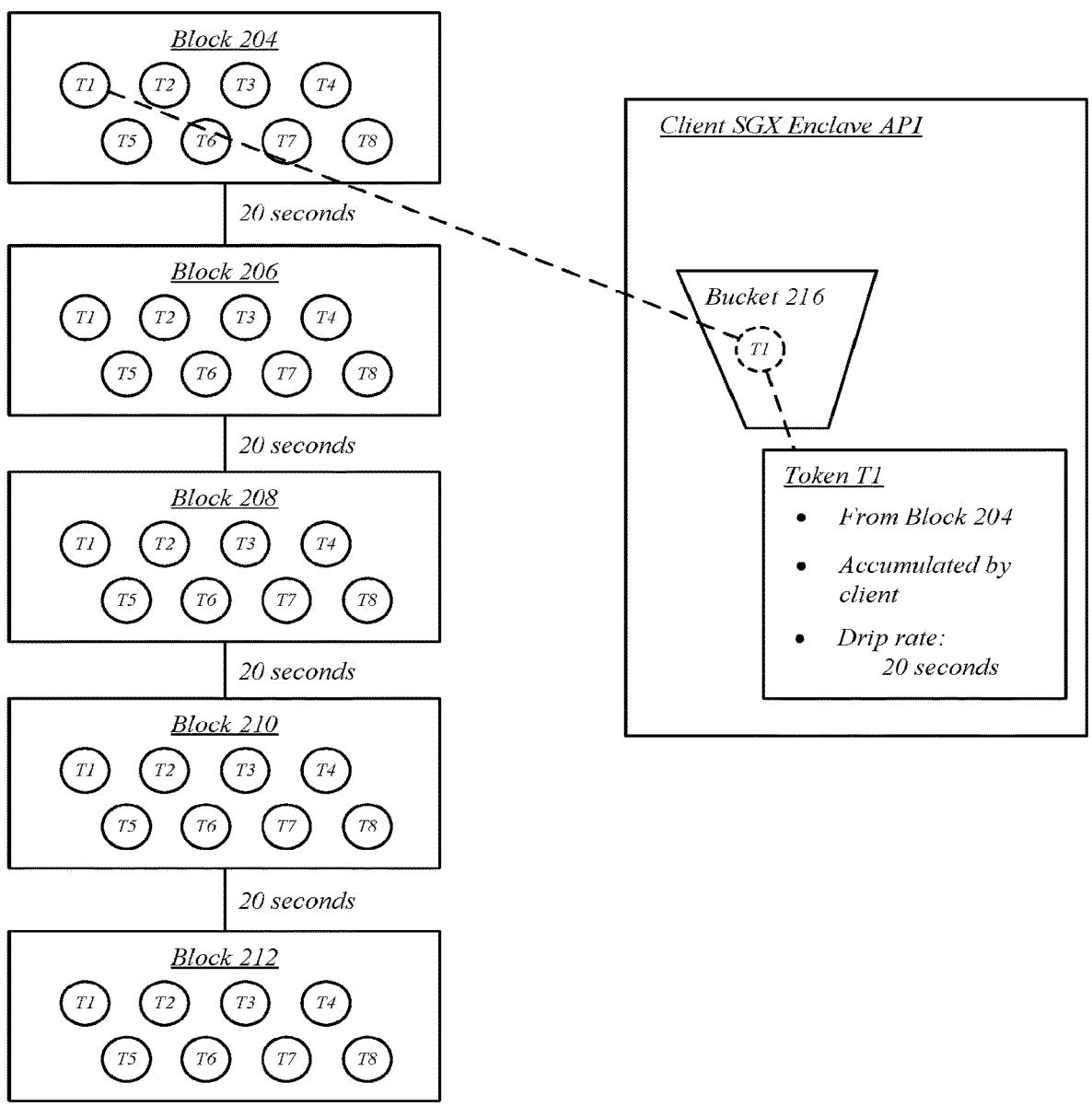
FIG. 2 illustrates an example token generation and token accumulation according to one or more embodiments.

FIG. 2 illustrates token generation and token accumulation according to embodiments of the present disclosure. As described above, a distributed ledger may be a blockchain system, which may include one or more blockchains. As illustrated, blockchain 202 may include at least five different blocks: block 204, block 206, block 208, block 210, and block 212, all of which may be consecutively chained or linked together. Although not shown, it may be understood that there may be many more blocks linked to the blockchain.

In examples, the blocks of the blockchain 202 may be published at a specific rate, e.g., every 20 second, every 10 minutes, etc., which may be determined or established by the distributed ledger. For instance, block 206 may be published 20 seconds after the publication of block 204, block 208 may be published 20 seconds after the publication of block 206, and so on. And each block of the blockchain 202 may generate one or more tokens to implement a token-bucket flow control policy for the blockchain system, e.g., eight tokens T1 to T8 generated by each of the blocks 204, 206, 208, 210, 212, as shown. By using the publication rate of the blocks in the blockchain 202 as the drip rate of the tokens, e.g., the time a client is required to wait to be granted the next token, a robust, decentralized clock that exhibits regularity and global authority may be created for the flow control process. In at least that regard, the clock cannot be manipulated. Advantageously, every client in the blockchain system may be bound by this clock, which promotes regularity and allows the clients to police themselves to ensure that the clock is obeyed.

The number of tokens generated by each block may be determined or established by policies enforced by the distributed ledger depending on its application and/or various use cases. By way of example, if an application that is being run on the distributed ledger platform requires ten packets to be transmitted every second, the number of tokens generated by each block may be set to 200 tokens (assuming the drip rate is one published block every 20 seconds). This way, the application may use all 200 tokens to acquire the desired bit rate. It may be understood that any suitable number of tokens may be generated by each block, e.g., more, or less, than 200 tokens.

As further shown in FIG. 2, a client, e.g., client computing device, may acquire at least one token from a block in the blockchain system. The one or more tokens may be collected, acquired, or accumulated into a client "bucket" 216 associated with the client. For example, via an SGX enclave application program interface (API), the client may select or retrieve a specific block from the blockchain system, such as block 204. Once a block is selected or retrieved, a token T1 may be collected, acquired, or accumulated therefrom and dropped into the client bucket 216. Thus, tokens may be added to the bucket 216 in a provably consistent manner based on a rate contained in or derived from a valid block stored on the distributed ledger. By way of example, if the distributed ledger uses PoET for consensus, the token drip rate may be computed from a "duration" field that is programmatically attached to the block.

The SGX enclave API may keep track of and map every token that may be accumulated in the client bucket 216. As shown, for instance, it is known that token T1 originated from block 204, accumulated by the client, at a drip rate of 20 seconds. Based on this information, the SGX enclave API may generate a token certificate, such as a proof-of-existence certification, for that token, which can be used by the client to submit a transaction. In examples, this token certificate may be sent to one or more validators to verify the certificate prior to the transaction. Because the SGX enclave provides computational integrity to the token mapping process, the submission of a transaction with a proof-of-existence certificate at least verifies to the distributed ledger (including the validators and clients) that the token has been legitimately accumulated by the client using it.

Figure 3:
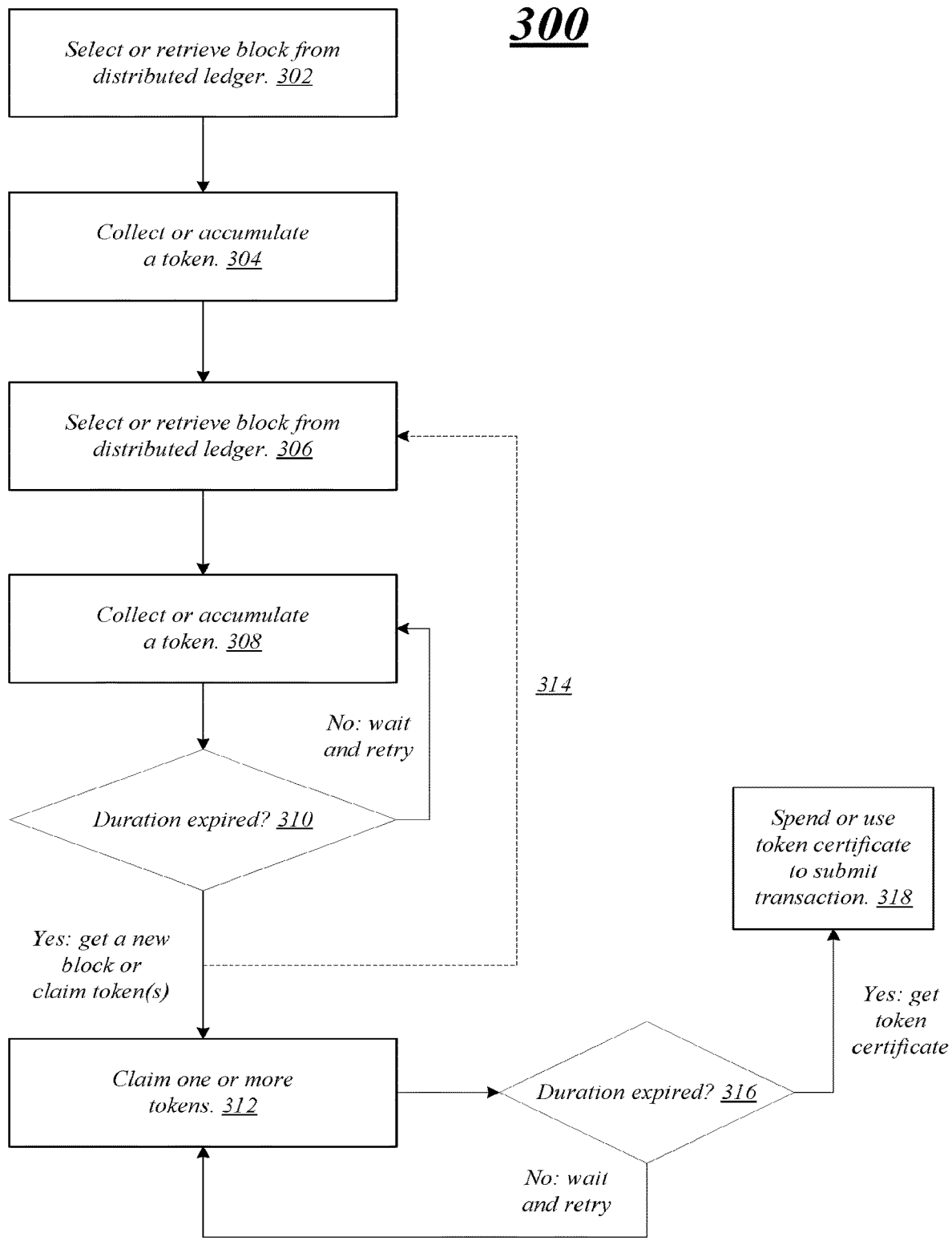
FIG. 3 illustrates an example flow diagram according to one or more embodiments.

FIG. 3 illustrates a flow diagram 300 according to embodiments of the present disclosure. The flow diagram 300 may be representative of some, or all, of the operations executed by one or more embodiments described herein. Further, the flow diagram 300 may be performed by circuitry, such as processing circuitry, which will be further described below. Moreover, the individual blocks or components of the flow diagram 300 are not required to be performed in any specific order and/or may be performed in conjunction with one or more other flow diagrams discussed herein.

The flow diagram 300 may be one example flow for token accumulation according to examples of the present disclosure. The flow diagram 300, or portions thereof, may be performed or executed by an SGX enclave application program interface (API), as described above. The flow diagram 300 begins at block 302. At block 302, a block may be selected or retrieved from a distributed ledger, which may be a blockchain system. Once a block has been selected or retrieved, a token generated by that block in the distributed ledger may be collected or accumulated by the client. At this point, the token count of the token bucket may be one.

In examples, the client may desire to collect or accumulate another token. Thus, at block 306, another block may be selected or retrieved from the distributed ledger. And, at block 308, a token that was generated by that block in the distributed ledger may be collected or accumulated. The token count of the token bucket may be incremented by one token and now the bucket may contain two tokens.

At this time, the client may continue to collect or accumulate more tokens, or alternatively, may choose to "claim" one or more of the accumulated tokens for transaction submission. Prior to either action, at block 310, it is determined whether a duration of time has expired. The duration of time may be the drip rate, or the clock rate, set by the distributed ledger, where the drip rate, for instance, is the time between the publications of two consecutive blocks in the distributed ledger. If the drip rate is 20 seconds, as described in the examples above, the client can either claim the one or more accumulated token or continue to accumulate additional tokens only after the 20 second duration has passed. If the 20 second duration has not expired, the client may be forced to wait until the duration expires, as shown.

In at least that regard, every client in the distributed ledger is predictably synchronized to this drip or clock rate, which can be verified by other clients and/or validators in the ledger. Although not shown in the flow diagram 300, it may be understood that the client may be required to wait until the duration, e.g., 20 seconds, has expired prior to collecting or accumulating the second token, e.g., the 20 second duration must elapse between blocks 304 and 306 of the flow diagram 300. Moreover, it may be understood that prior to performing any token-based action (e.g., selecting or retrieving a new block in the distributed ledger to collect or accumulate a token, claiming one or more tokens, spending or using a token, etc.) in the flow diagram 300, the duration of time must expire.

After the duration has expired at block 310, the one or more accumulated tokens may be claimed at block 312, and the number of tokens in the token bucket may be updated. Otherwise, yet another block in the distributed ledger may be selected or retrieved to collect or accumulate a third token, as indicated by arrow 314. When the one or more tokens are claimed at block 312, another determination may be made at block 316 with respect to whether the duration of time has expired. The duration may again be, for example, 20 seconds, which may be the drip or clock rate of the distributed ledger.

When it is determined that the duration of time has expired at block 316, a token certificate, e.g., a proof-of-existence certificate, may be generated by the SGX enclave API so that the one or more tokens claimed at block 312 can be spent or used to submit one or more transactions at block 318. The transactions may be submitted to one or more validators of the distributed ledger. In embodiments, the token certificate, which may be vouched by the SGX enclave API, may be a certification that verifies one or more of the following: that the one or more tokens actually exist, that the one or more tokens have been legitimately collected or accumulated without violating the drip or clock rate set by the distributed ledger, and that the one or more tokens belong to the client requesting the transaction submission.

Moreover, the certificate may include verification that the one or more tokens have not been previously used for past transaction submissions. The token certificate thus ensures that the client can indeed submit the one or more transactions using the one or more claimed tokens, thereby creating a flow control policy in the distributed ledger that is secure, robust, and trustworthy without having to tie the distributed ledger to a digital-currency-based system.

The flow diagram 300 shows that a second token is collected or accumulated and stored in the token bucket (e.g., blocks 306 and 308) thereby incrementing the token count to a total of two tokens. It may be understood, however, that the client may decide to collect or accumulate only one token (e.g., blocks 302 and 304) and immediately claim the token to submit a transaction (e.g., blocks 312 and 318). Other suitable variations of the token accumulation process may be established and/or customized by the client. For example, the client may establish a flow policy where at least a predetermined number of tokens must be stored in the token bucket before any tokens can be claimed and used for submitting a transaction.

Figure 4:
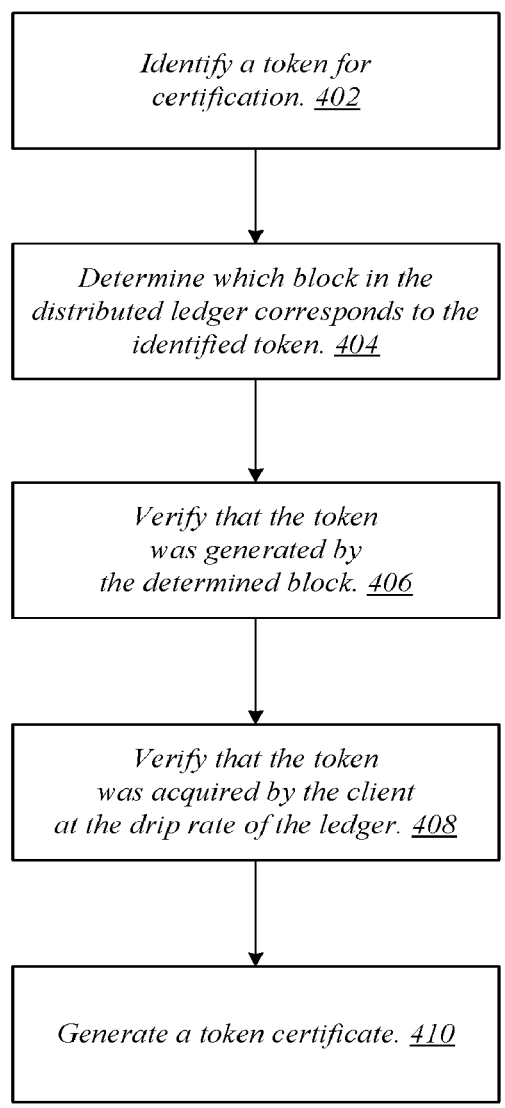
FIG. 4 illustrates another example of a flow diagram according to one or more embodiments.

FIG. 4 illustrates a flow diagram 400 according to embodiments of the present disclosure. The flow diagram 400 may be representative of some, or all, of the operations executed by one or more embodiments described herein. Further, the flow diagram 400 may be performed by circuitry, such as processing circuitry, which will be further described below. Moreover, the individual blocks or components of the flow diagram 400 are not required to be performed in any specific order and/or may be performed in conjunction with one or more other flow diagrams discussed herein.

The flow diagram 400 may be one example flow for generating a token certificate, e.g., a proof-of-existence certificate, such as the one described above with respect to FIG. 3, according to examples of the present disclosure. The flow diagram 400, or portions thereof, may be performed or executed by an SGX enclave API, as described above. The flow diagram 400 begins at block 402. At block 402, a token may be identified for token certification. For example, the token may be certified by the SGX enclave API as soon as it is collected or accumulated by a client. In other examples, the token may be identified for certification when the token has been claimed by the client to submit a transaction, e.g., block 312 of flow diagram 300.

At block 404, a determination may be made as to which block in the distributed ledger corresponds to the token identified at block 402, e.g., determine where the token originated from. In examples, this determination may be based on information, such as metadata, included in the token itself, and/or may be provided to the SGX enclave API the moment the token is collected or accumulated by the client.

Once a specific block in the distributed ledger has been identified as the source of the token, at block 406, the SGX enclave API may verify whether the token was indeed generated by that block in the ledger. For example, this verification may be provided by one or more validators in the distributed ledger, or in a further example, the verification may be performed by the SGX enclave API itself by checking that block in the ledger. This verification may be performed to double-check that the token indeed originated from the block in the ledger it claims to have come from. This is because, in some instances, an untrusted client (e.g., a bad actor) may falsely claim that a token originated from a specific block in the distributed ledger to make it appear legitimate.

At block 408, the SGX enclave API may also verify that the token was indeed acquired by the client. Moreover, the API may also verify whether the token was acquired at the correct drip rate, or the clock rate, set by the distributed ledger. Once all the verifications are complete, a token certificate may be generated at block 410. As described above, the token certificate may be used to submit a transaction.

In examples, the token certificate may additionally include a verification that the token has not been previously used. The verification may be performed by the SGX enclave, or it may be performed by one or more validators in the distributed ledger. For instance, the one or more validators may search the blocks of the blockchain for any previous transaction that was submitted by the client using the same token.

It may be understood that the certification process may be performed as soon as the token is accumulated in the bucket, may be performed when the token has been claimed for submission of a transaction, or may be performed any time prior to the client submitting a transaction.

Figure 5:
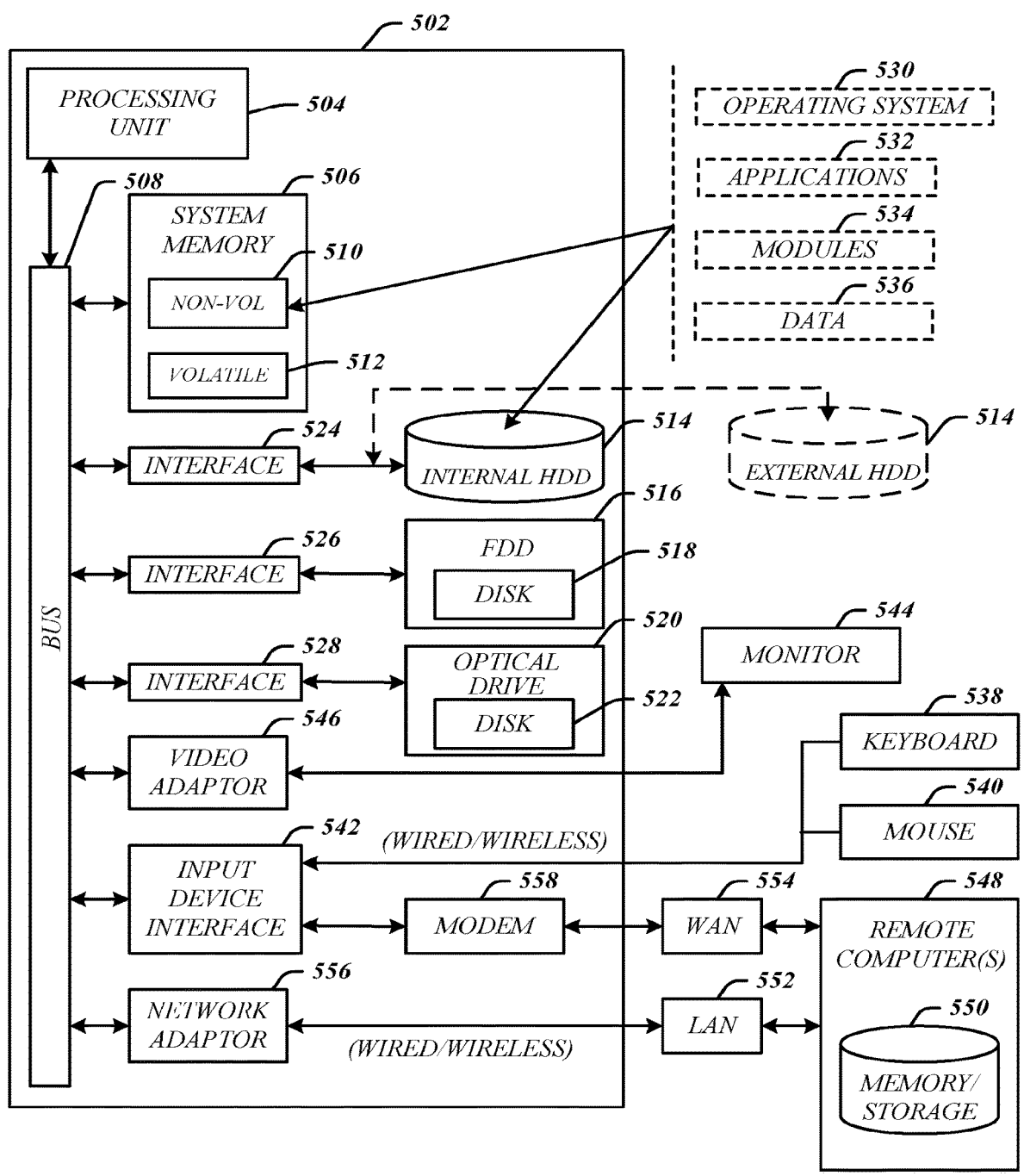
FIG. 5 illustrates an example computing architecture according to one or more embodiments.

FIG. 5 illustrates an example computing architecture 500, e.g., of a computing device, such as a computer, laptop, tablet computer, mobile computer, smartphone, etc., suitable for implementing various embodiments as previously described. In one embodiment, the computing architecture 500 may include or be implemented as part of a system, which will be further described below. In examples, one or more computing devices and the processing circuitries thereof may be configured as components of the distributed ledger, e.g., the validators, the clients, etc. Moreover, the one or more computing devices may include an SGX enclave and may run an SGX enclave API.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in this figure, the computing architecture 500 includes a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in this figure, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the system 700.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of computing device may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 6:
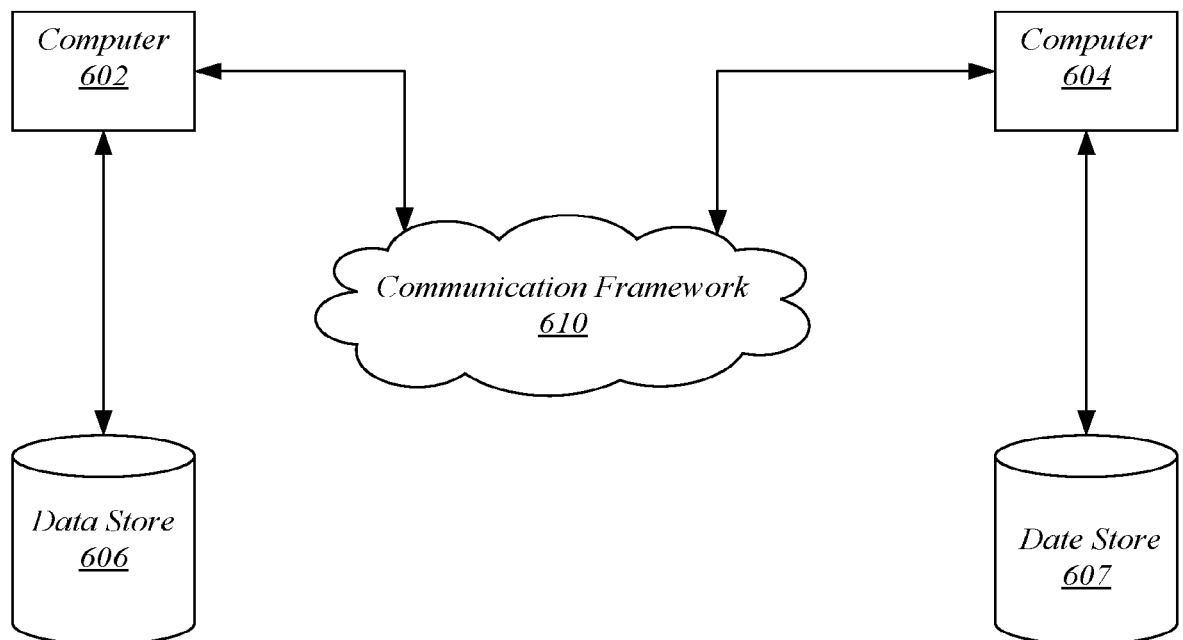
FIG. 6 illustrates an example communications architecture according to one or more embodiments.

FIG. 6 illustrates an exemplary communications architecture 600 suitable for implementing various embodiments. For example, one or more computing devices may communicate with each other via a communications framework 610, which may be a network implemented in a distributed ledger for facilitating communication among the validators, the clients, and other computing devices associated with the distributed ledger.

The communications architecture 600 includes various common communications elements, such as a transmitter, receiver, transceiver, radio, network interface, baseband processor, antenna, amplifiers, filters, power supplies, and so forth. The embodiments, however, are not limited to implementation by the communications architecture 600.

As shown in FIG. 6, the communications architecture 600 includes a computer 602 and a computer 604, which are operatively connected to one or more respective client data stores 606 and 607 that can be employed to store information local to the respective computers 602 and servers 604, such as cookies and/or associated contextual information. By way of example, computer 602 may be a client computer in the distributed ledger and computer 604 may be a validator computer.

Computers 602 and 604 may communicate information between each other using a communication framework 610.

The communications framework 610 may implement any well-known communications techniques and protocols. The communications framework 610 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 610 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by computers 602 and 604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 7:
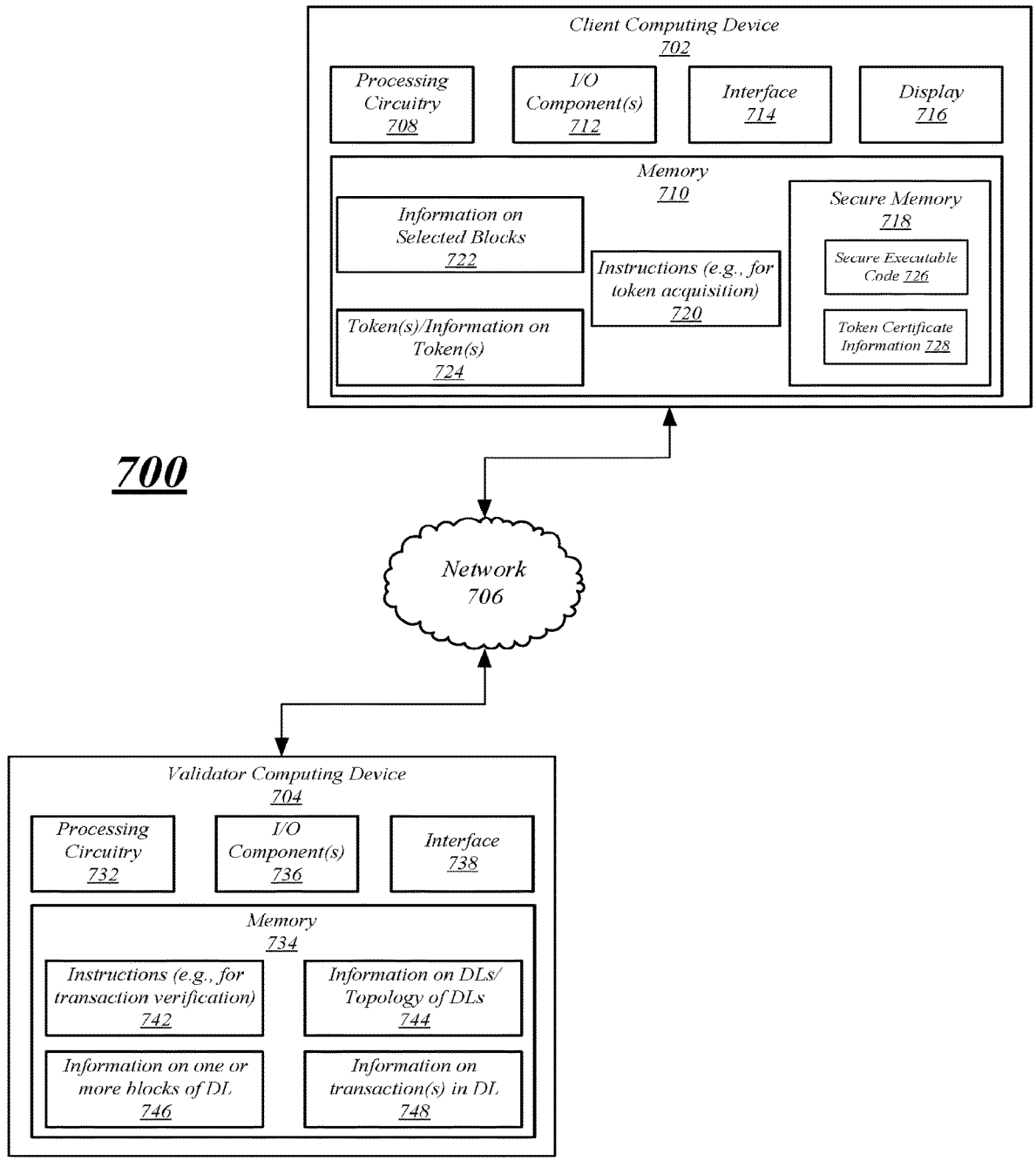
FIG. 7 illustrates an example system according to one or more embodiments.

FIG. 7 illustrates an example client-validator system 700 according to embodiments of the present disclosure. As shown, system 700 includes at least a client computing device 702 and a validator computing device 704 connected to each other via network 706. Network 706 could be, for example, a local area network (LAN), a wide area network (WAN), or a cellular network (e.g., LTE, 3GPP, or the like). In some embodiments, network 706 could include the Internet. While a single client computing device 702 and a single validator computing device 704 is shown, it may be understood that many more validator computing devices and client computing devices may be connected to each other via the network 706.

In examples, the client computing device 702 may include, at least in part, processing circuitry (e.g., a processor) 708, a memory 710, I/O component(s) 712, an interface 714, and a display 716. As illustrated, memory 710 may store one or more instructions for executing specific functions, for example, instructions 720 may include instructions for token acquisition from the distributed ledger by the client computing device 704. Instructions 720 can also include and correspond to a web browser application used to access a website or a mobile application used to access a mobile application. Memory 710 may also store information 722 on selected blocks from the distributed ledger and token(s)/information on token(s) 724. Moreover, as shown, the memory 710 may include a secure memory portion 718. The secure memory portion 718 may store secure executable code 726 and information 728 on one or more token certificates. The instructions 720 and the secure executable code 726 may be executable or executed by the processing circuitry 708. All other information stored in memory 710 may also be accessible by or provided to the processing circuitry 708.

Similar to the client computing device 702, in examples, the validator computing device 704 may include processing circuitry (e.g., a processor), a memory 734, I/O components 736, and an interface 738. As shown, memory 734 may store various data or information, such as instructions 742, information 744 on one or more distributed ledgers (DLs) and/or one or more topologies of the DLs, information 746 on one or more blocks of each DL, and information 748 on one or more transactions performed in or by the DL. The instructions 742, for example, may include instructions or executable code for the validator computing device 704 (via the processing circuitry 732) to perform transaction verification, such as verifying a token certificate transmitted by a client computing device connected to the network 706. The instructions 742 may be executable or executed by the processing circuitry 732. Moreover, all other information stored in memory 734 may also be accessible by or provided to the processing circuitry 708.

According to examples, the processing circuitries 708 and/or 732 may include circuitry or processor logic, such as, for example, any of a variety of commercial processors. In some examples, they may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitries 708 and/or 732 may include graphics processing portions and may include dedicated memory, multiple-threaded processing and/or some other parallel processing capability.

The memories 710 and/or 734 may include logic, a portion of which includes arrays of integrated circuits, forming non-volatile memory to persistently store data or a combination of non-volatile memory and volatile memory. It is to be appreciated, that the memories 710 and/or 734 may be based on any of a variety of technologies. In particular, the arrays of integrated circuits included in the memories may be arranged to form one or more types of memory, such as, for example, dynamic random access memory (DRAM), NAND memory, NOR memory, or the like.

The I/O component(s) 712 and/or 736 may include one or more components to provide input to or to provide output from the client computing device 702 and/or the validator computing device 704. For example, the I/O component(s) 712 and/or 736 may be a keyboard (hardware, virtual, etc.), mouse, joystick, microphone, track pad, button, touch layers of a display, haptic feedback device, camera, microphone, speaker, or the like Interfaces 714 and/or 738 may include logic and/or features to support a communication interface. For example, they may include one or more interfaces that operate according to various communication protocols or standards to communicate over direct or network communication links. Direct communications may occur via use of communication protocols or standards described in one or more industry standards (including progenies and variants). For example, the interfaces 714 and/or 738 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like.

Display 716 can be based on any of a variety of display technologies, such as, for example, a cathode ray tube (CRT), a liquid crystal display (LCD), plasma display, light emitting diode (LED) display, or an organic light emitting diode (OLED) display. With some examples, display 716 can be a touch sensitive display. It is noted, display 716 may be external to the client computing device 702, such as, for example, embodied as a computer monitor or television and coupled thereto via any of a variety of display data interfaces. It may be understood that although not shown, validator computing device 704 may also include a display, similarly configured to display 716.

As described above, during operation, a user may use the client computing device 702 may select a block from the distributed ledger, collect or accumulate that token, determine whether a duration of time has expired, and claim the token to submit a transaction. Prior to submitting the transaction, a token certificate may be generated by the client computing device 702, which is submitted to the validator computing device 704 over the network 706. The validator computing device 704 may verify that the token used by the client computing device 702 was legitimately acquired by comparing the information contained in the certificate with the information associated with the published blocks of the distributed ledger. Moreover, the validator computing device may also maintain and keep track of numerous transactions in the distributed ledger, including the one performed for the client computing device 702.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The disclosure now turns to a number of illustrative examples.

Example 1. An apparatus, comprising: memory to store instructions; and processing circuitry, coupled to the memory, operable to execute the instructions, that when executed, cause the processing circuitry to: select a first block from a distributed ledger; collect a first token, wherein the first token is generated by the first block; determine whether a first duration of time has expired; and perform an action after the first duration of time has expired.

Example 2. The apparatus of example 1, wherein the performed action comprises the processing circuitry to claim the first token to submit a transaction.

Example 3. The apparatus of example 2, the processing circuitry to: determine whether a second duration of time has expired after the first token has been claimed; and submit the transaction via a token certificate after the second duration of time has expired.

Example 4. The apparatus of example 3, wherein the transaction is submitted to one or more validators in the distributed ledger to verify the token certificate.

Example 5. The apparatus of example 3, wherein the token certificate includes a verification that the first token exists.

Example 6. The apparatus of example 3, wherein the token certificate includes a verification that the first token was generated by the first block.

Example 7. The apparatus of example 3, wherein the token certificate includes a verification that the first token was claimed after the first duration of time.

Example 8. The apparatus of example 3, wherein the token certificate includes a verification that the transaction was submitted after the second duration of time.

Example 9. The apparatus of example 3, wherein the token certificate includes a verification that the first token corresponds to a correct client.

Example 10. The apparatus of example 3, wherein the token certificate includes a verification that the first token has not been previously used.

Example 11. The apparatus of example 1, wherein the first duration of time is a time between a publication of the first block and a publication of a second block immediately following the first block by the distributed ledger.

Example 12. The apparatus of example 3, wherein the first duration of time is a time between a publication of the first block and a publication of a second block immediately following the first block by the distributed ledger, and wherein the second duration of time is equal to the first duration of time.

Example 13. The apparatus of example 1, wherein the distributed ledger is a blockchain system.

Example 14. The apparatus of example 1, wherein the performed action comprises the processing circuitry to: select a second block from the distributed ledger; and collect a second token, wherein the second token is generated by the second block.

Example 15. The apparatus of example 3, wherein the memory further comprises a set of secure executable code, wherein the set of secure executable code, when executed by the processing circuitry, causes the processing circuitry to generate the token certificate.

Example 16. The apparatus of example 14, the processing circuitry to: determine whether a second duration of time has expired after the second token has been collected; and claim the first token, the second token, or the first and second tokens to submit one or more transactions after the second duration of time has expired.

Example 17. The apparatus of example 16, the processing circuitry to: determine whether a third duration of time has expired after the first token, the second token, or the first and second tokens has been claimed; and submit the one or more transactions to one or more validators of the distributed ledger with or using one or more token certificates after the third duration of time has expired.

Example 18. The apparatus of example 2, wherein the transaction is a transmission of one or more data packets.

Example 19. A system comprising the apparatus of any one of examples 1 to 18.

Example 20. A method for flow control, comprising: selecting a first block from a distributed ledger; collecting or accumulating a first token, wherein the first token is generated by the first block; determining whether a first duration of time has expired; and performing an action after the first duration of time has expired.

Example 21. The method of example 20, wherein the performing of the action comprises claiming the first token to submit a transaction.

Example 22. The method of example 21, the method further comprising determining whether a second duration of time has expired after the first token has been claimed; and submitting the transaction via a token certificate after the second duration of time has expired.

Example 23. The method of example 22, wherein the transaction is submitted to one or more validators in the distributed ledger to verify the token certificate.

Example 24. The method of example 22, wherein the token certificate includes a verification that the first token exists.

Example 25. The method of example 22, wherein the token certificate includes a verification that the first token was generated by the first block.

Example 26. The method of example 22, wherein the token certificate includes a verification that the first token was claimed after the first duration of time.

Example 27. The method of example 22, wherein the token certificate includes a verification that the transaction was submitted after the second duration of time.

Example 28. The method of example 22, wherein the token certificate includes a verification that the first token corresponds to a correct client.

Example 29. The method of example 22, wherein the token certificate includes a verification that the first token has not been previously used.

Example 30. The method of example 20, wherein the first duration of time is a time between a publication of the first block and a publication of a second block immediately following the first block by the distributed ledger.

Example 31. The method of example 22, wherein the first duration of time is a time between a publication of the first block and a publication of a second block immediately following the first block by the distributed ledger, and wherein the second duration of time is equal to the first duration of time.

Example 32. The method of example 20, wherein the distributed ledger is a blockchain system.

Example 33. The method of example 20, wherein the performing of the action comprises: selecting a second block from the distributed ledger; and collecting or accumulating a second token, wherein the second token is generated by the second block.

Example 34. The method of example 22, wherein the method further comprises generating the token certificate by a set of secure executable code included in a memory.

Example 35. The method of example 33, the method further comprising: determining whether a second duration of time has expired after the second token has been collected; and claiming the first token, the second token, or the first and second tokens to submit one or more transactions after the second duration of time has expired.

Example 36. The method of example 35, the method further comprising: determining whether a third duration of time has expired after the first token, the second token, or the first and second tokens has been claimed; and submitting the one or more transactions to one or more validators of the distributed ledger with or using one or more token certificates after the third duration of time has expired.

Example 37. The method of example 2, wherein the transaction is a transmission of one or more data packets.

Example 38. A system for flow control comprising: a plurality of computing devices, wherein the plurality of computing devices includes at least a validator computing device and a client computing device, the validator computing device comprising: memory to store instructions; and processing circuitry, coupled to the memory, operable to execute the instructions, that when executed, cause the processing circuitry to: verify or maintain a plurality of transactions in a distributed ledger; and the client computing device comprising: memory to store instructions; and processing circuitry, coupled to the memory, operable to execute the instructions, that when executed, cause the processing circuitry to: select a first block from the distributed ledger, collect a first token, wherein the first token is generated by the first block, determine whether a first duration of time has expired, and claim the first token to submit a transaction.

Example 39. The system of example 38, the processing circuitry of the client computing device to: determine whether a second duration of time has expired after the first token has been claimed; and submit the transaction via a token certificate after the second duration of time has expired.

Example 40. The system of example 39, the processing circuitry of the client computing device to submit the transaction to at least the validator computing device, and the processing circuitry of the validator computing device to verify one or more portions of the token certificate.

Example 41. The system of example 39, wherein the token certificate includes one or more of the following: (i) a verification that the first token exists, (ii) a verification that the first token was generated by the first block, (iii) a verification that the first token was claimed after the first duration of time, (iv) a verification that the transaction was submitted after the second duration of time, (v) a verification that the first token corresponds to a correct client, and (vi) a verification that the first token has not been previously used.

Example 42. The system of example 38, wherein the first duration of time is a time between a publication of the first block and a publication of a second block immediately following the first block by the distributed ledger.

Example 43. The system of example 38, wherein the distributed ledger is a blockchain system.

Example 44. The system of example 39, wherein the memory of the client computing device furthers comprises a set of secure executable code, wherein the set of secure executable code, when executed by the processing circuitry, causes the processing circuitry to generate the token certificate Example 45. The system of example 38, wherein the transaction is a transmission of one or more data packets.

Example 46. At least one machine-readable storage medium comprising instructions that when executed by at least one processor, causes the at least one processor to: select a first block from a distributed ledger; collect a first token, wherein the first token is generated by the first block; determine whether a first duration of time has expired; and perform an action after the first duration of time has expired.

Example 47. The at least one machine-readable storage medium of example 46, wherein the performed action comprises the processor to: claim the first token to submit a transaction; determine whether a second duration of time has expired after the first token has been claimed; and submit the transaction via a token certificate after the second duration of time has expired.

Example 48. The at least one machine-readable storage medium of example 46, wherein the performed action comprises the processor to: select a second block in the distributed ledger; collect a second token, wherein the second token is generated by the second block; determine whether a second duration of time has expired after the second token has been collected; claim the first token, the second token, or the first and second tokens to submit one or more transactions after the second duration of time has expired; determine whether a third duration of time has expired after the first token, the second token, or the first and second tokens has been claimed; and submit the one or more transactions to one or more validators of the distributed ledger with or using one or more token certificates after the third duration of time has expired.

Example 49. The at least one machine-readable storage medium of example 47, further comprising a set of secure executable code, wherein the set of secure executable code, when executed by the at least one processor, generates the token certificate.

Example 50. An apparatus comprising means to perform the method of any one of examples 20 to 37.

Example 51. A system comprising means to perform the method of any one of examples 20 to 37.

Example 52. At least one machine-readable storage medium comprising means to perform the method of any one of the examples 20 to 37.

Example 53. An apparatus comprising the at least one machine-readable storage medium of any one of examples 46 to 49.

Example 54. A system comprising the at least one machine-readable storage medium of any one of examples 46 to 49.

What is claimed is:

1. An apparatus comprising:
processing circuitry coupled to a memory, the processing circuitry to:
   collect a first token, wherein the first token is generated by a first block that is selected from a distributed ledger, wherein the distributed ledger includes a blockchain ledger to check a drip rate and one or more previous transactions relating to the first token, wherein the drip rate represents a wait time between publication of two tokens in a blockchain;
   claim the first token based when a first duration of time has expired, wherein the first duration of time is a time between a first publication of the first block and a second publication of a second block, immediately following the first block; and
   submit a transaction to one or more validators associated with the distributed ledger to verify a token certificate.

2. The apparatus of claim 1, wherein the token certificate includes one or more of the following: (i) a verification that the first token exists, (ii) a verification that the first token was generated by the first block, (iii) a verification that the first token was claimed after the first duration of time, (iv) a verification that the transaction was submitted after the second duration of time, (v) a verification that the first token corresponds to a correct client, or (vi) a verification that the first token has not been previously used.

3. The apparatus of claim 1, wherein the apparatus comprises a distributed ledger computing device having a blockchain ledger computing device, wherein the memory further comprises a set of secure executable code, wherein the set of secure executable code, when executed by the processing circuitry, causes the processing circuitry to generate the token certificate, wherein the processing circuitry includes application processing circuitry or graphics processing circuitry.

4. A method comprising:
collecting, by a processor of a computing device, a first token, wherein the first token is generated by a first block that is selected from a distributed ledger, wherein the distributed ledger includes a blockchain ledger to check a drip rate and one or more previous transactions relating to the first token, wherein the drip rate represents a wait time between publication of two tokens in a blockchain;
claiming the first token when a first duration of time has expired, wherein the first duration of time is a time between a first publication of the first block and a second publication of a second block, immediately following the first block; and
submitting a transaction to one or more validators associated with the distributed ledger to verify a token certificate.

5. The method of claim 4, wherein the token certificate includes one or more of the following: (i) a verification that the first token exists, (ii) a verification that the first token was generated by the first block, (iii) a verification that the first token was claimed after the first duration of time, (iv) a verification that the transaction was submitted after the second duration of time, (v) a verification that the first token corresponds to a correct client, or (vi) a verification that the first token has not been previously used, wherein the computing devices includes a distributed ledger computing device having a blockchain ledger computing device, wherein the processor includes an application processor or a graphics processor.

6. At least one non-transitory computer-readable medium having stored thereon instructions which, when executed, cause a computing device to perform operations comprising:
- collecting a first token, wherein the first token is generated by a first block that is selected from a distributed ledger, wherein the distributed ledger includes a blockchain ledger to check a drip rate and one or more previous transactions relating to the first token, wherein the drip rate represents a wait time between publication of two tokens in a blockchain;
- claiming the first token based on a determination that a first duration of time has expired, wherein the first duration of time is a time between a publication of the first block and a publication of a second block, immediately following the first block; and
- submitting a transaction to one or more validators associated with the distributed ledger to verify a token certificate.

7. The medium of claim 6, wherein the token certificate includes one or more of the following: (i) a verification that the first token exists, (ii) a verification that the first token was generated by the first block, (iii) a verification that the first token was claimed after the first duration of time, (iv) a verification that the transaction was submitted after the second duration of time, (v) a verification that the first token corresponds to a correct client, or (vi) a verification that the first token has not been previously used, wherein the computing devices includes a distributed ledger computing device having a blockchain ledger computing device, wherein the computing device includes one or more processors having one or more application processors or one or more graphics processors.

* * * * *